(12) United States Patent
Hur et al.

(10) Patent No.: US 12,439,050 B2
(45) Date of Patent: Oct. 7, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Hyejung Hur, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 18/026,741

(22) PCT Filed: Oct. 29, 2021

(86) PCT No.: PCT/KR2021/015409
§ 371 (c)(1),
(2) Date: Mar. 16, 2023

(87) PCT Pub. No.: WO2022/092886
PCT Pub. Date: May 5, 2022

(65) Prior Publication Data
US 2023/0345008 A1 Oct. 26, 2023

(30) Foreign Application Priority Data
Oct. 30, 2020 (KR) .................. 10 2020 0143426

(51) Int. Cl.
*H04N 19/136* (2014.01)
*H04N 19/117* (2014.01)
(Continued)

(52) U.S. Cl.
CPC ......... *H04N 19/136* (2014.11); *H04N 19/117* (2014.11); *H04N 19/174* (2014.11); *H04N 19/597* (2014.11); *H04N 19/96* (2014.11)

(58) Field of Classification Search
CPC .. H04N 19/136; H04N 19/597; H04N 19/117; H04N 19/174; H04N 19/96
See application file for complete search history.

(56) References Cited

U.S. PATENT DOCUMENTS

2021/0063578 A1* 3/2021 Wekel .................. G01S 17/894

FOREIGN PATENT DOCUMENTS

| KR | 102020000733 A | 1/2020 |
| KR | 1020200007735 A | 1/2020 |

(Continued)

OTHER PUBLICATIONS

3DG, "G-PCC codec description v8", International Organisation for Standardisation Organisation Internationale De Normalisation ISO/IEC JTC1/SC29/WG11 Coding of Moving Pictures and Audio, ISO/IEC JTC1/SC29/WG11 N19525, Jul. 2020 (Year: 2020).*

(Continued)

*Primary Examiner* — Kathleen V Nguyen
(74) *Attorney, Agent, or Firm* — Bryan Cave Leighton Paisner LLP

(57) ABSTRACT

A point cloud data transmission method according to embodiments may comprise the steps of encoding point cloud data, and transmitting the point cloud data. A point cloud data reception device according to embodiments may comprise a reception unit for receiving a bitstream including point cloud data, and a decoder for decoding the point cloud data.

18 Claims, 26 Drawing Sheets

(51) Int. Cl.
  *H04N 19/174* (2014.01)
  *H04N 19/597* (2014.01)
  *H04N 19/96* (2014.01)

(56) References Cited

FOREIGN PATENT DOCUMENTS

| KR | 1020200038534 A | 4/2020 |
|---|---|---|
| WO | 2020005363 A1 | 1/2020 |

OTHER PUBLICATIONS

3DG, "G-PCC codec description v8", International Organisation for Standardisation Organisation Internationale De Normalisation ISO/IEC JTC1/SC29/WG11 Coding of Moving Pictures and Audio, ISO/IEC JTC1/SC29/WG11 N19525, Jul. 2020.

\* cited by examiner

FIG. 6
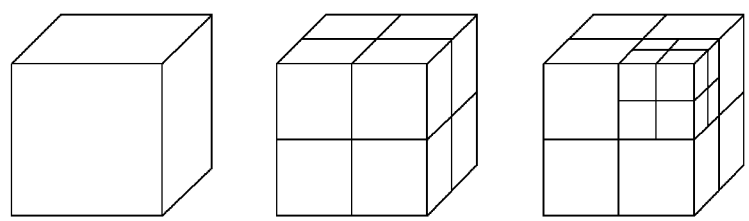
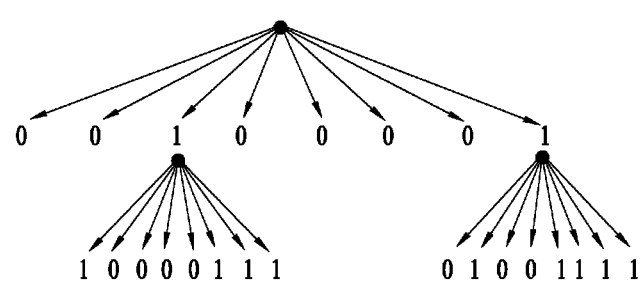

FIG. 7
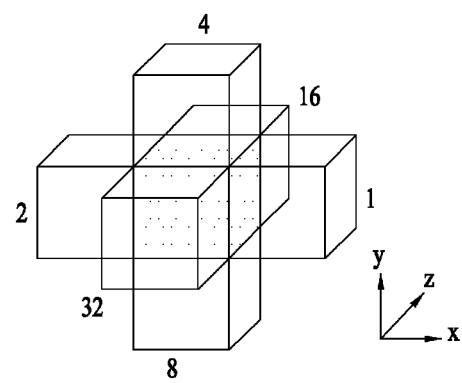
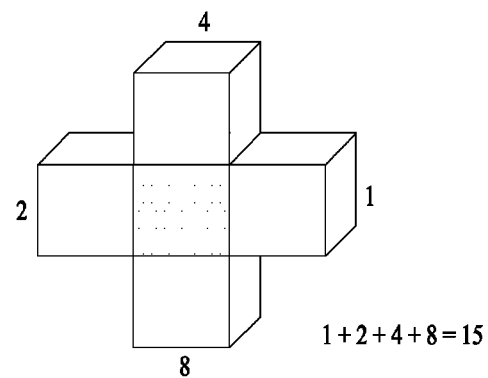
1 + 2 + 4 + 8 = 15

FIG. 16

| | x | y | z | red | green | blue | reflectance | time | laserangle | nx | ny | nz |
|---|---|---|---|---|---|---|---|---|---|---|---|---|
| 1 | x | y | z | red | green | blue | reflectance | time | laserangle | nx | ny | nz |
| 2 | 1042972 | 18989 | 3970 | 192 | 192 | 192 | 7905 | 449029.99 | -5 | 0.07 | 0.90 | 0.43 |
| 3 | 1038883 | 13349 | 4009 | 192 | 192 | 192 | 1785 | 449029.99 | -4.3333 | (0.01) | 1.00 | (0.03) |
| 4 | 1047232 | 22515 | 3314 | 17 | 18 | 14 | 15555 | 449029.99 | -2.3333 | (0.00) | 0.94 | 0.35 |
| 5 | 1058494 | 37456 | 3051 | 20 | 23 | 32 | 24225 | 449029.99 | -1.6667 | 0.01 | 0.15 | (0.99) |
| 6 | 1047494 | 21962 | 3072 | 11 | 13 | 11 | 10200 | 449029.99 | -1 | (0.04) | 0.24 | (0.97) |
| 7 | 1047425 | 21391 | 2948 | 14 | 15 | 12 | 21930 | 449029.99 | -0.3333 | (0.02) | (0.08) | 1.00 |
| 8 | 1047577 | 21124 | 2822 | 12 | 12 | 10 | 3825 | 449029.99 | 0.3333 | 0.11 | 0.88 | 0.45 |
| 9 | 1047575 | 20622 | 2691 | 13 | 14 | 13 | 9945 | 449029.99 | 1 | (0.05) | 0.17 | (0.98) |
| 10 | 1047547 | 20065 | 2556 | 192 | 192 | 192 | 3825 | 449029.99 | 1.6667 | (0.78) | 0.50 | (0.37) |
| 11 | 1058875 | 37280 | 2865 | 28 | 22 | 21 | 42585 | 449029.99 | 2.3333 | (0.01) | (0.05) | 1.00 |
| 12 | 1058932 | 37243 | 2834 | 28 | 23 | 25 | 43350 | 449029.99 | 3 | (0.00) | 1.00 | 0.00 |
| 13 | 1058990 | 37205 | 2803 | 38 | 32 | 33 | 43095 | 449029.99 | 3.6667 | (0.01) | 0.98 | 0.20 |
| 14 | 1059050 | 37172 | 2772 | 79 | 65 | 62 | 41820 | 449029.99 | 4.3333 | 0.00 | (0.04) | 1.00 |
| 15 | 1059113 | 37144 | 2741 | 81 | 68 | 68 | 33150 | 449029.99 | 5 | 0.01 | 0.20 | (0.98) |
| 16 | 1059170 | 37105 | 2710 | 77 | 59 | 61 | 27285 | 449029.99 | 5.6667 | 0.00 | (0.07) | 1.00 |
| 17 | 1059225 | 37063 | 2679 | 74 | 65 | 66 | 24735 | 449029.99 | 6.3333 | (0.08) | 0.97 | (0.24) |
| 18 | 1059281 | 37022 | 2647 | 78 | 65 | 65 | 23970 | 449029.99 | 7 | (0.02) | 0.19 | (0.98) |
| 19 | 1059337 | 36980 | 2616 | 72 | 63 | 65 | 20400 | 449029.99 | 7.6667 | (0.07) | 0.97 | (0.24) |
| 20 | 1059393 | 36938 | 2584 | 82 | 68 | 74 | 31875 | 449029.99 | 8.3333 | 0.03 | (0.02) | 1.00 |
| 21 | 1059454 | 36905 | 2553 | 77 | 67 | 75 | 40545 | 449029.99 | 9 | 0.02 | (0.09) | 1.00 |
| 22 | 1059513 | 36867 | 2522 | 75 | 66 | 67 | 26520 | 449029.99 | 9.6667 | (0.06) | 0.90 | (0.43) |
| 23 | 1059569 | 36824 | 2490 | 81 | 70 | 71 | 14280 | 449029.99 | 10.3333 | (0.13) | 0.86 | (0.50) |
| 24 | 1059570 | 36810 | 2460 | 41 | 44 | 67 | 26010 | 449029.99 | 11 | (0.02) | 0.34 | (0.94) |
| 25 | 1059627 | 36768 | 2427 | 30 | 30 | 33 | 42339 | 449029.99 | 11.6667 | (0.09) | 0.91 | (0.40) |
| 26 | 1059692 | 36739 | 2396 | 49 | 38 | 36 | 42330 | 449029.99 | 12.3333 | (0.04) | 0.95 | (0.32) |
| 27 | 1059750 | 36697 | 2364 | 55 | 44 | 43 | 43860 | 449029.99 | 13 | 0.09 | 0.08 | 0.99 |
| 28 | 1059809 | 36654 | 2331 | 60 | 52 | 52 | 44370 | 449029.99 | 13.6667 | (0.02) | 0.33 | (0.94) |
| 29 | 1059869 | 36613 | 2298 | 52 | 47 | 50 | 43860 | 449029.99 | 14.3333 | (0.07) | 0.89 | (0.45) |
| 30 | 1059930 | 36575 | 2266 | 63 | 54 | 53 | 44115 | 449029.99 | 15 | (0.09) | 0.92 | (0.38) |
| 31 | 1059991 | 36534 | 2233 | 71 | 63 | 66 | 45390 | 449029.99 | 15.6667 | 0.00 | 0.36 | (0.93) |

| geometry_data_unit_header( ) { | Descriptor |
|---|---|
| gsh_geometry_parameter_set_id | ue(v) |
| gsh_tile_id | ue(v) |
| gsh_slice_id | ue(v) |
| frame_ctr | u(v) |
| if( !sps_entropy_continuation_enabled_flag ) { | |
| .... | |
| } | |
| if( gps_gsh_box_log2_scale_present_flag ) | |
| gsh_box_log2_scale | ue(v) |
| gsh_box_origin_bits_minus1 | ue(v) |
| for( k = 0; k < 3; k++ ) | |
| gsh_box_origin_xyz[ k ] | u(v) |
| ... | |
| gsh_geometry_angular_enabled_flag | u(1) |
| if( gsh_geometry_angular_enabled_flag ){ | |
| for( k = 0; k < 3; k++ ) | |
| gsh_geom_angular_origin_xyz[ k ] | se(v) |
| } | |
| ... | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application is a National Phase application under 35 U.S.C. 371 of International Application No. PCT/KR2021/015409, filed on Oct. 29, 2021, which claims the benefit of Korean Application No. 10-2020-0143426, filed on Oct. 30, 2020, the contents of which are incorporated by reference herein in their entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIGS. 16 and 17 show an example of points of point cloud data according to embodiments;

FIG. 24 shows syntax of a geometry data unit header according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
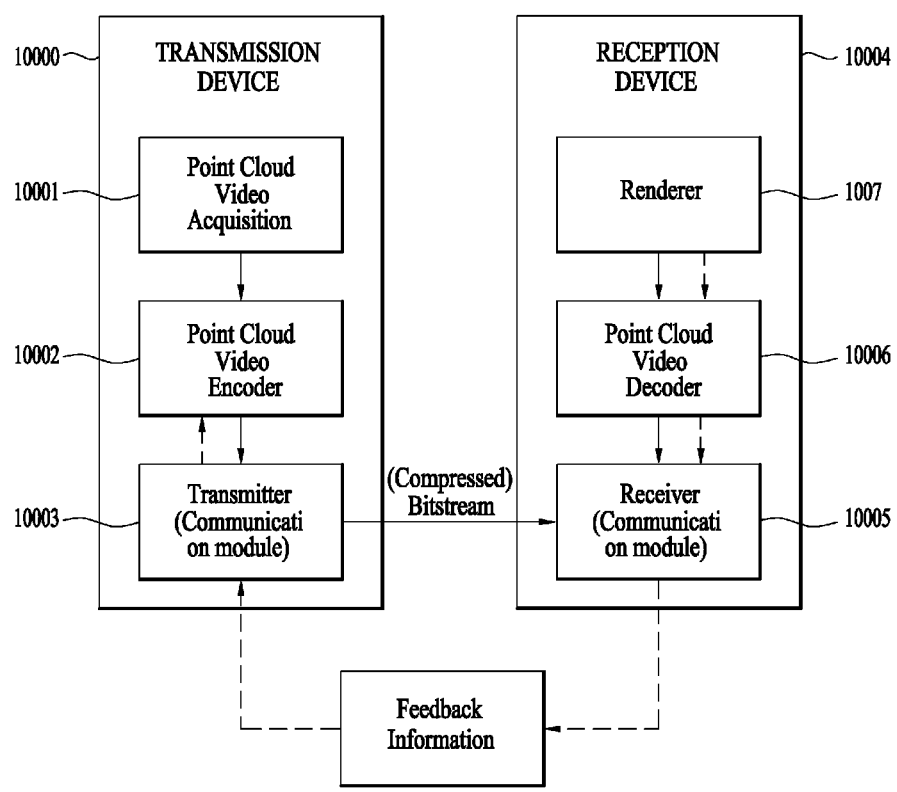
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
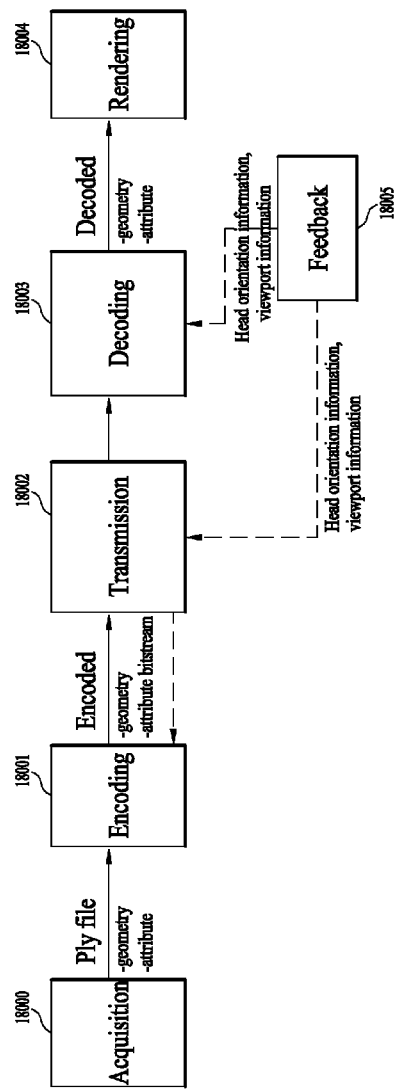
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003)

according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
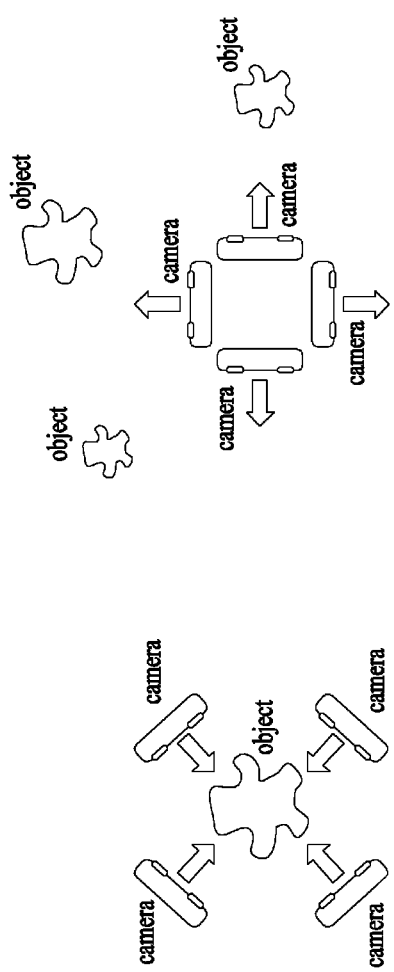
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
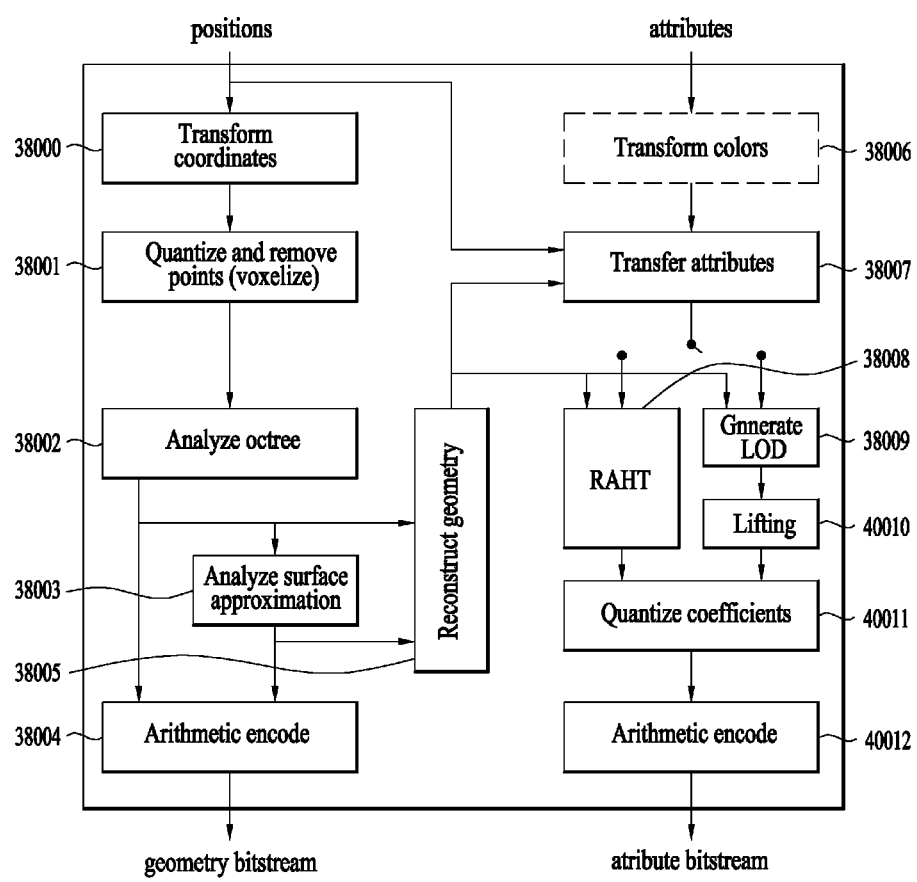
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
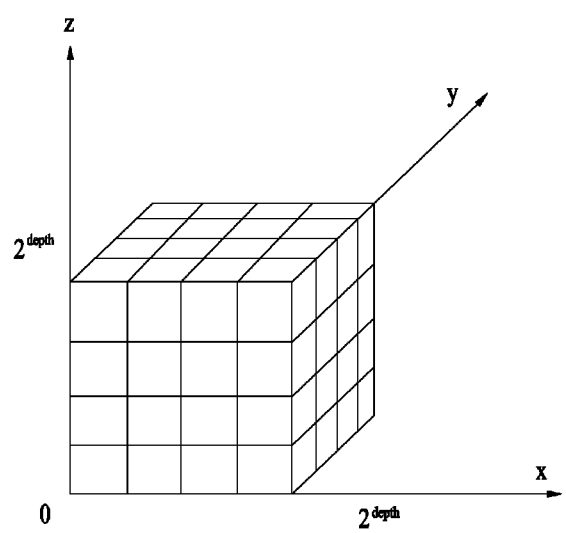
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \qquad \text{i)}$$

-continued $$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
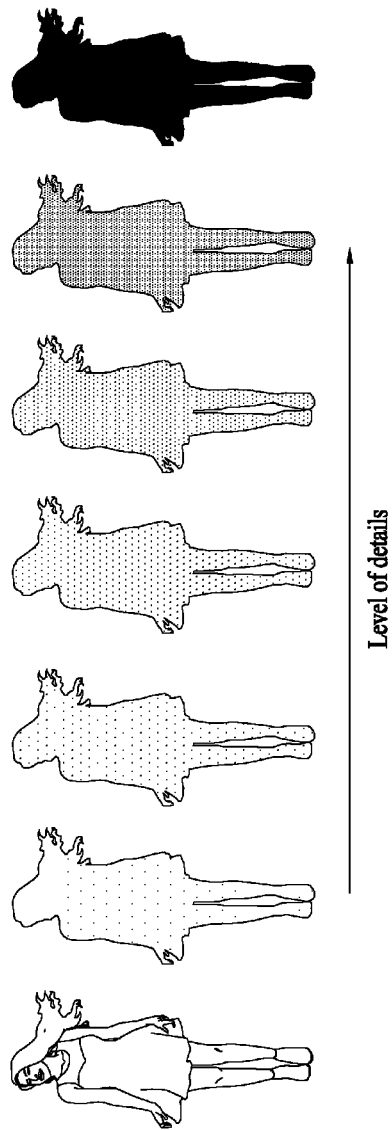
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
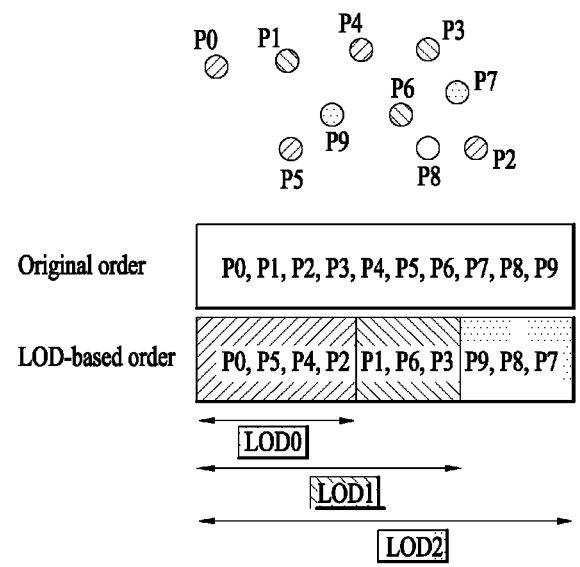
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
  if( value >=0) {
    return floor(value / quantStep + 1.0 / 3.0);
  } else {
    return -floor(-value / quantStep + 1.0 / 3.0);
  }
}
```

TABLE

Attribute prediction residuals inverse quantization pseudo code

```
int PCCInverseQuantization(int value, int quantStep) {
  if( quantStep ==0) {
    return value;
  } else {
    return value * quantStep;
  }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
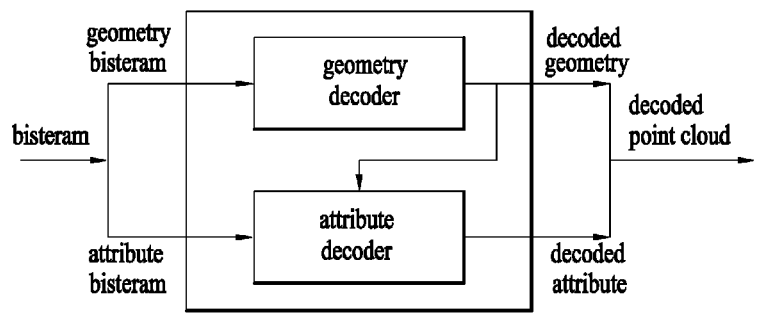
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
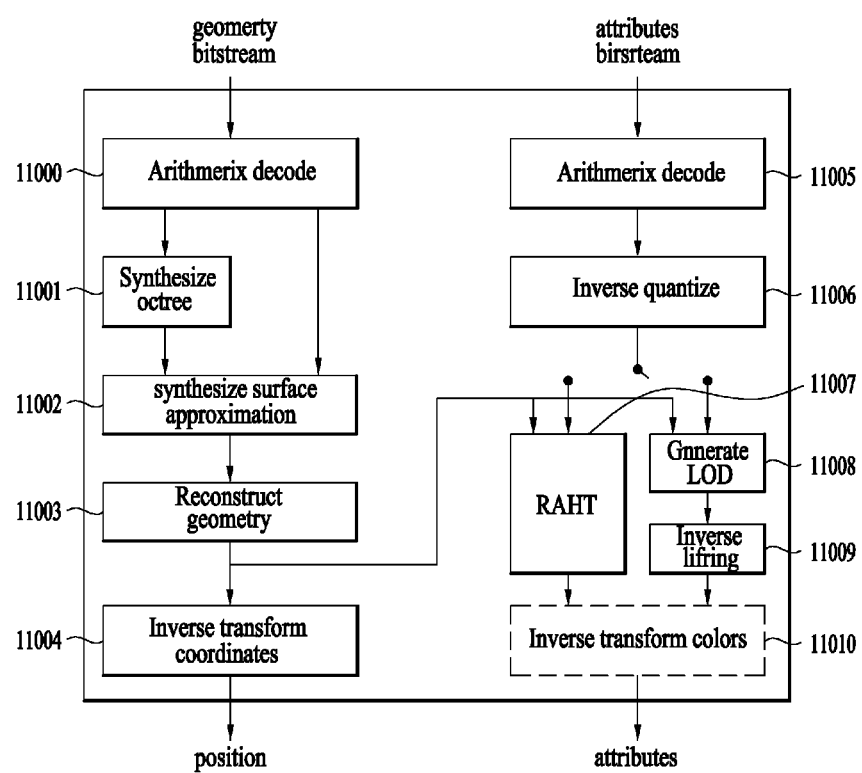
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
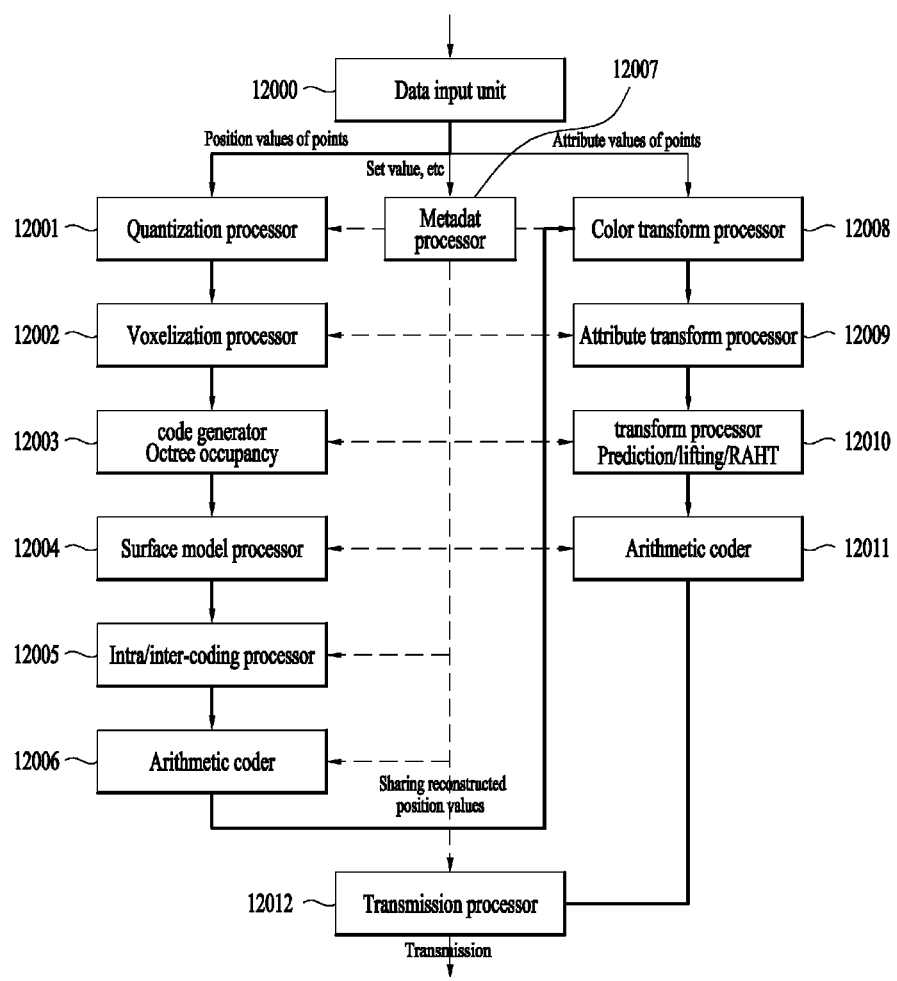
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
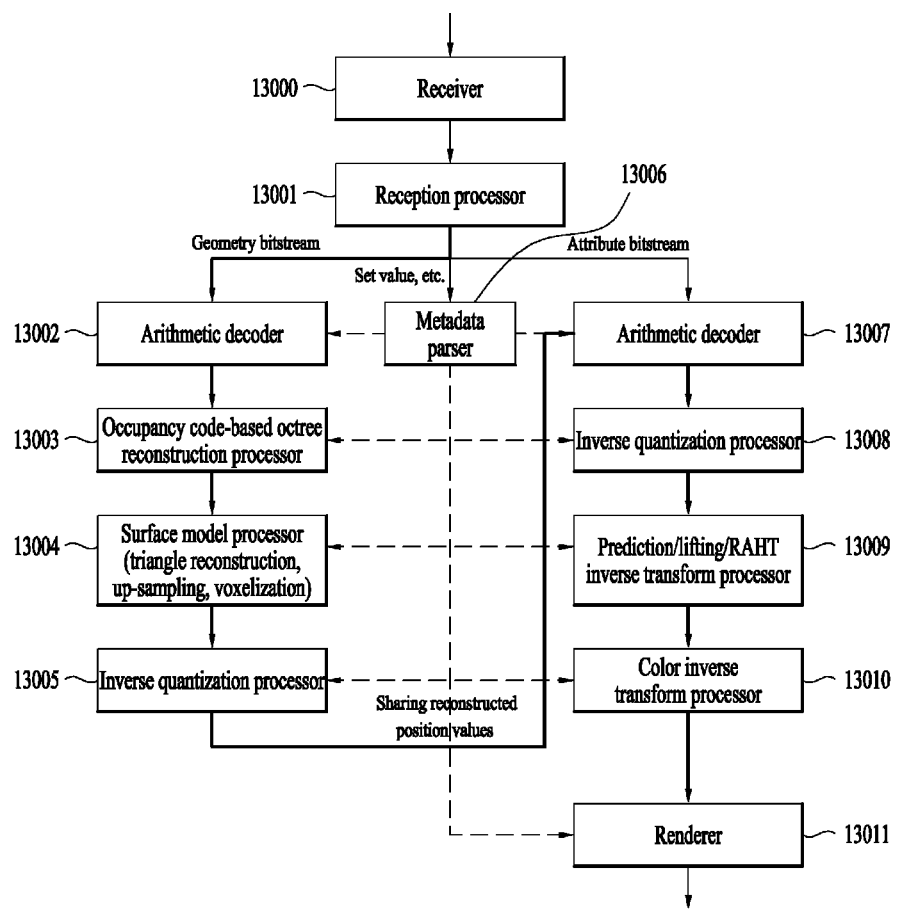
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
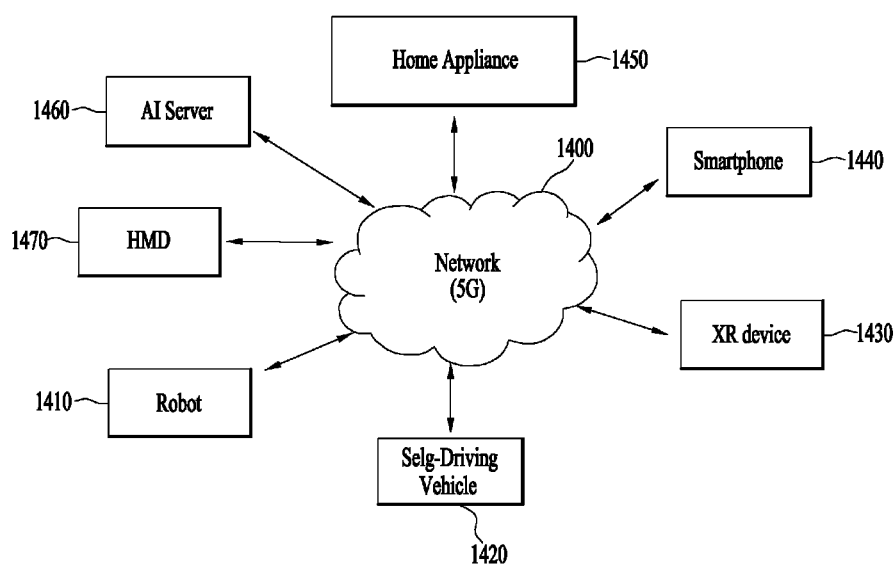
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 20:
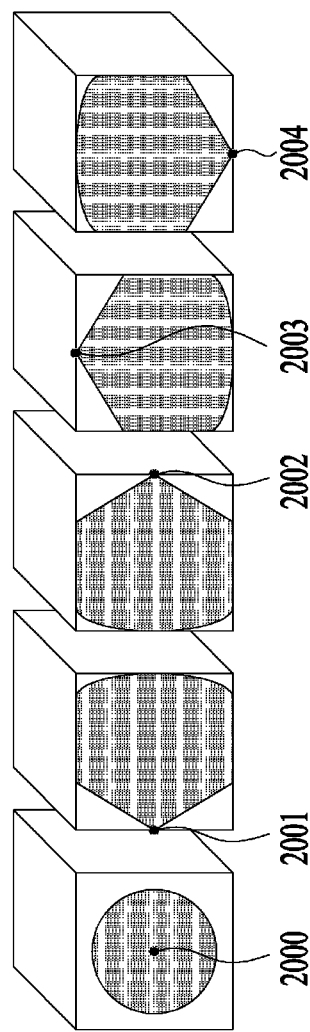
FIG. 20 illustrates an example of estimating a position of a slice sensor according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 20, and the like.

Figure 21:
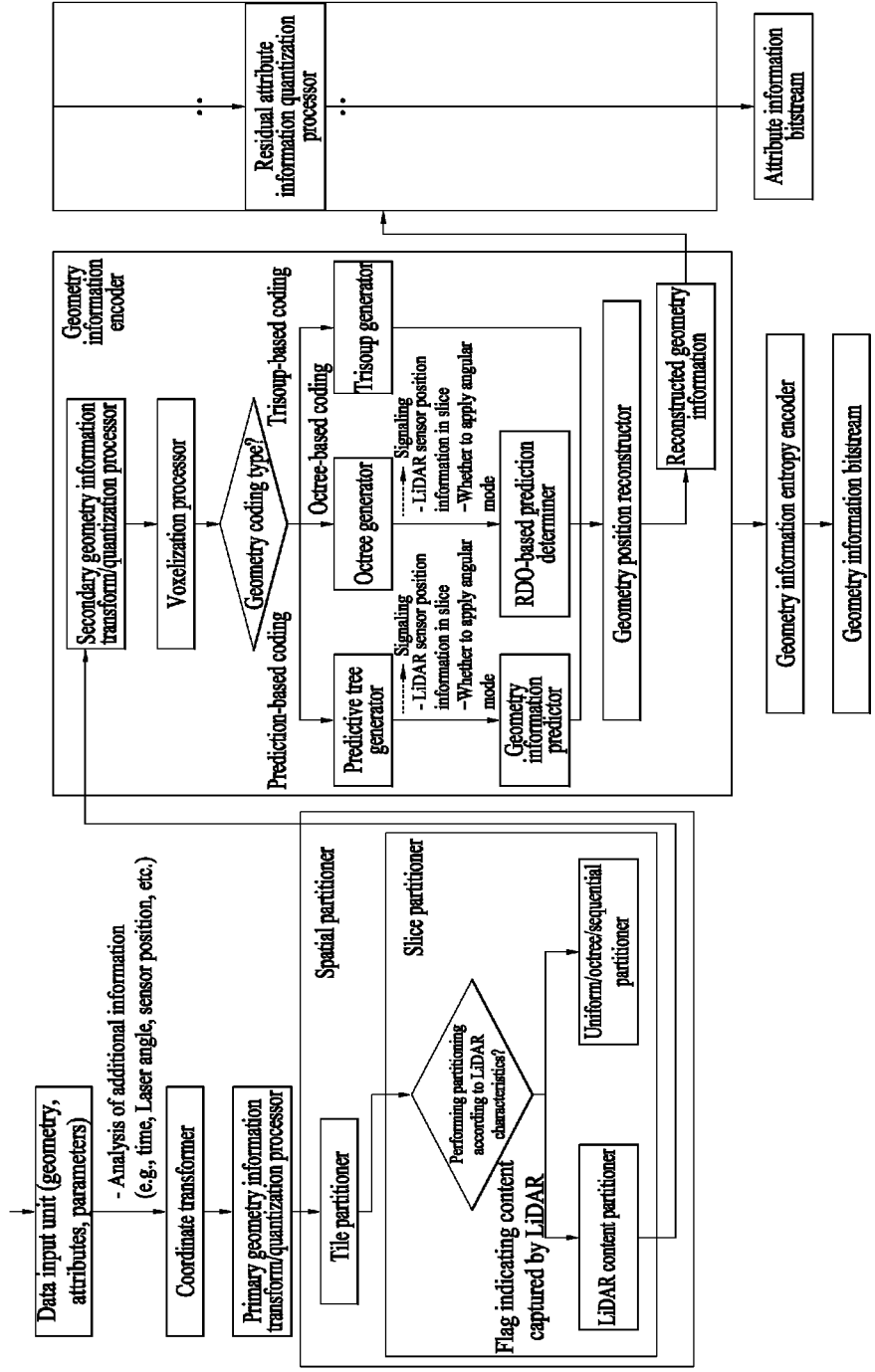
FIG. 21 illustrates a point cloud data transmission device according to embodiments.

The point cloud data reception method/device according to embodiments may be construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 21, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

A method/device for transmitting and receiving point cloud data according to embodiments may perform slice partitioning for 3D map content related to the point cloud data.

The point cloud data according to the embodiments may be point cloud frames captured by LiDAR equipment. These data may be point cloud content. For efficient geometry compression in geometry-based point cloud compression (G-PCC), the point cloud data may be partitioned into slices to be compressed and reconstructed. Data acquired by LiDAR equipment may be LiDAR 3D map data.

Methods/devices according to embodiments may encode and decode point cloud data in various forms. For example, 3D map data may be encoded and decoded. A method/device according to embodiments may provide a slice partitioning scheme and a signaling scheme for using a geometry angular mode.

Embodiments relate to a method for increasing compression efficiency of geometry-based point cloud compression (G-PCC) for 3D point cloud data compression.

Hereinafter, an encoder or an encoding device is referred to as an encoder, and a decoder or a decoding device is referred to as a decoder.

A point cloud is composed of a set of points, and each of the points may have geometry information and attribute information. The geometry information is three-dimensional position (XYZ) information, and the attribute information is values of a color (RGB, YUV, etc.) and/or reflectance.

In the G-PCC encoding process, the point cloud may be divided into tiles according to regions, and each tile may be divided into slices for parallel processing. The G-PCC encoding process may include compressing geometry slice by slice and compressing the attribute information based on the geometry reconstructed with position information changed through compression (reconstructed geometry=decoded geometry).

The G-PCC decoding operation includes receiving an encoded slice-based geometry bitstream and attribute bitstream, decoding geometry, and decoding attribute information based on the geometry reconstructed through the decoding operation.

A method for compression of geometry information includes octree-based compression, predictive tree-based compression, or trisoup-based compression.

Furthermore, the embodiments include a slice partitioning scheme for increasing compression efficiency of geometry of content captured with LiDAR equipment.

Figure 15:
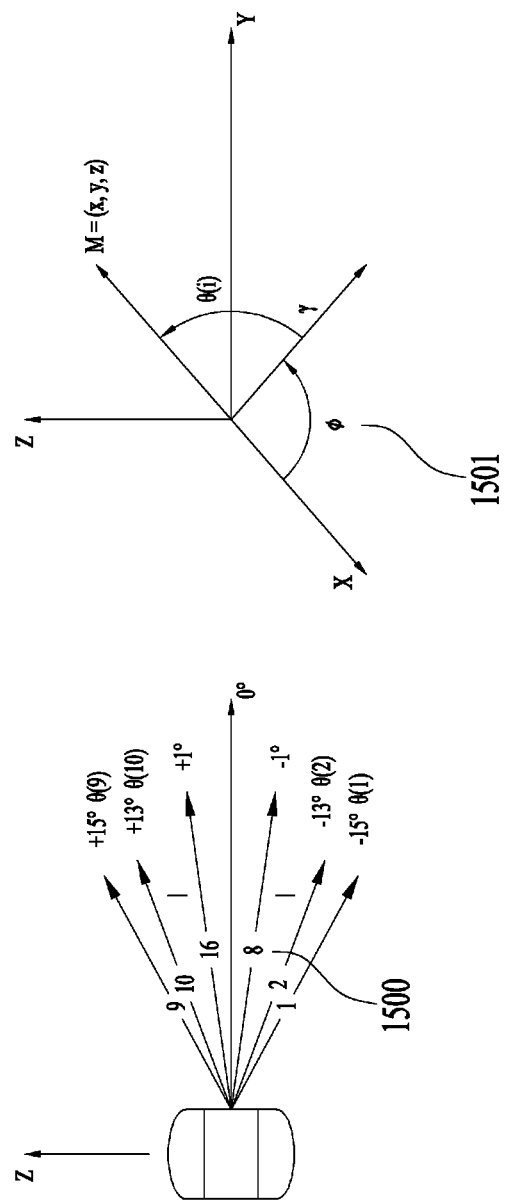
FIG. 15 shows a spinning LiDAR acquisition model according to embodiments.

FIG. 15 shows a spinning LiDAR acquisition model according to embodiments.

As shown in FIG. 15, the point cloud data processed by the methods/devices for transmitting and receiving point cloud data according to the embodiments may be data acquired based on a spinning LiDAR acquisition model.

Depth information may be extracted through the LiDAR equipment using a laser system, which measures the position coordinates of a reflector by emitting a laser pulse and measuring the time it takes to receive the reflected pulse in order to capture point cloud content. The point cloud content generated through the LiDAR equipment may be composed of multiple frames, or may integrate multiple frames into one piece of content.

LiDAR may include N lasers (N=16, 32, 64, etc.) 1500 at different elevations $\theta(i)_{i=1\ldots N}$, and the lasers are based on the Z axis. The lasers may capture point cloud data while spinning about the Z-axis by an azimuth $\phi$ 1501 (see FIG. 15). This type is called a spinning LiDAR model. The point cloud content captured according to the spinning LiDAR model has angular characteristics.

Laser i may hit object M, and the position of M may be estimated as (x, y, z) in the Cartesian coordinate system (see FIG. 15). In this case, when the position of M is represented as (r, $\phi$, i) rather than (x, y, z) in the Cartesian coordinate system, a rule among points may be derived favorably for compression due to the fixed positions of the laser sensors, the straightness, and spinning of the sensors by a certain azimuth angle, and the like. Here, r may be a radius, $\phi$ may be an azimuth or azimuth angle, and i may be an elevation, an index i according to a LiDAR elevation, or a LiDAR ID.

The transmission method/device (e.g., encoder, data input unit, coordinate transformer, spatial partitioner, etc.) according to the embodiments may scan points having a rule associated with spinning characteristics of each laser (e.g., laser ID) 1500 acquired through spinning of a plurality of LiDAR lasers, and present the points in a LiDAR-based coordinate system rather than the Cartesian coordinate system.

Therefore, for the data captured by the spinning LiDAR equipment, compression efficiency may be increased (by about 20%) by applying an angular mode in the geometry encoding/decoding process based on such characteristics. The angular mode is a method of compressing data based on (r, i) rather than (x, y, z). Embodiments may process both Cartesian coordinates and/or spherical coordinates suitable for data characteristics.

When frames are captured and stored one by one through LiDAR equipment, the angular mode may be applied. When multiple frames are captured with LiDAR equipment and integrated into one piece of content to generate 3D map data. When the position is changed to the angular characteristic, that is, the angle (r, i) representing the data captured by the LiDAR equipment, regularity of points may be hidden. Accordingly, applying the angular mode may not be as efficient as Cartesian coordinate-based compression.

According to embodiments, geometry compression may be efficiently performed on 3D map data of one piece of content into which frames captured by the LiDAR equipment are integrated. To this end, data may be partitioned into slices such that the angular mode may be applied.

Embodiments may be modified and combined. The terms used in this document may be understood based on the intended meaning of the terms within the scope widely used in the related art.

Slice partitioning may be performed by the PCC encoder and slice integration may be performed by the PCC decoder. The angular mode to the partitioned point cloud slices may be applied by the PCC geometry encoder and the data may be reconstructed in the PCC geometry decoding operation of the PCC decoder.

The method/device according to embodiments may include or perform slice partitioning of 3D map data, geometry coding, and/or attribute coding. Specifically, the methods of slice partitioning of 3D map data may include slice partitioning when time and laser angle are given, slice partitioning when only time is given, slice partitioning when only laser angle is given, slice partitioning when neither time nor laser angle is given, slice partitioning when Frame id is given, and/or slice partitioning when position information about the LiDAR equipment is given.

In addition, the geometry coding may include deriving position information about a sensor when slice partitioning is performed based on a laser angle, deriving position information about a sensor when slice partitioning is performed based on the position information about the LiDAR equipment, and other methods of deriving position information about a sensor.

The method/device according to the embodiments may perform attribute coding after the slice partitioning and geometry coding.

Figure 17:
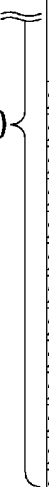

FIGS. 16 and 17 show an example of points of point cloud data according to embodiments.

A point corresponding to point cloud data encoded/decoded by the transmission/reception method/device according to the embodiments may have a position and attributes as shown in FIGS. 16 and 17.

3D map data captured by LiDAR equipment and integrated into one piece of content may be partitioned into slices to perform geometry compression based on the characteristics of the content captured by LiDAR.

A point cloud may have the following additional data in addition to the geometry data of position (x, y, z) and attribute data of attribute values (red, green, blue, reflectance). For example, the additional data may include time, laser angle, and normal position (nx, ny, nz). A normal position refers to a normal vector.

Referring to FIGS. 16 and 17, a one-rotation data set of a laser angle azimuth $\phi$ may be distinguished at the same time through time and laser angle. For example, −5 to 185 degrees in rows #2 to #285 (1600) may be classified as one cycle.

Slice partitioning when the time and laser angle are given according to embodiments:

When the point cloud content has a time and a laser angle, slices may be separated through the following process (steps 1 to 5).

The decimal point position n of the value of time to be rounded off in terms of accuracy may be set. The decimal point position may be a set value and may be input to the device according to the embodiments.

The number of spinning cycles divided into one slice may be set by the value of c. The number of cycles may be a set value and may be input to the device according to the embodiments.

1. Points may be sorted in chronological order.
2. The time obtained by rounding the time ti at the n-th position below the decimal point may be defined as
3. laser_angle_min and laser_angle_max, which are upper and lower limits of the laser angle range of points having the same may be obtained.
4. Points having the same t'i and belonging to the laser angle range (laser_angle_min, laser_angle_max) may be classified as points of one spinning cycle.
5. Points belonging to cycle c may be classified and registered as one slice.

Slice partitioning when only time is given according to embodiments:

When the point cloud content has only time, slices may be separated through the following process (steps 1 to 4).

The decimal point position n of the value of time to be rounded off in terms of accuracy may be set. The decimal point position may be a set value and may be input to the device according to the embodiments.

The number of spinning cycles divided into one slice may be set by the value of c. The number of cycles may be a set value and may be input to the device according to the embodiments.

1. Points may be sorted in chronological order.
2. The time obtained by rounding time ti at the n-th position below the decimal point may be defined as t'i.
3. Points having the same t'i may be classified as points in one spinning cycle.
4. Points belonging to cycle c may be classified and registered as one slice.

Slice partitioning when only the laser angle is given according to embodiments:

When the point cloud content has only the laser angle, slices may be separated through the following process (steps 1 to 4).

The maximum distance (max_cycle_range) may be set. The maximum distance may be a set value and may be input to the device according to the embodiments.

The decimal point position n of the value of the laser angle to be rounded off in terms of accuracy may be set. The decimal point position may be a set value and may be input to the device according to the embodiments.

A reference point corresponding to (centerx, centery, centerz) may be set. The coordinates of the reference point may be set values and may be input to the device according to the embodiments. However, when there is no input, (0, 0, 0) may be adopted.

1. The upper and lower limits laser_angle_min and laser_angle_max of the laser angle range of all points may be obtained.
2. The laser angle obtained by rounding off laser angle i at the n-th decimal point may be defined as 'i.
3. Points are having the same value of 'i may be sorted. When 'i is the same, points may be sorted by the radius r from the reference point.
4. Points may be classified and registered as a slice based on the maximum distance (max_cycle_range) from the start point (e.g., the leftmost point) based on the laser angle having the longest point arrangement (FIG. 18).

Figure 18:
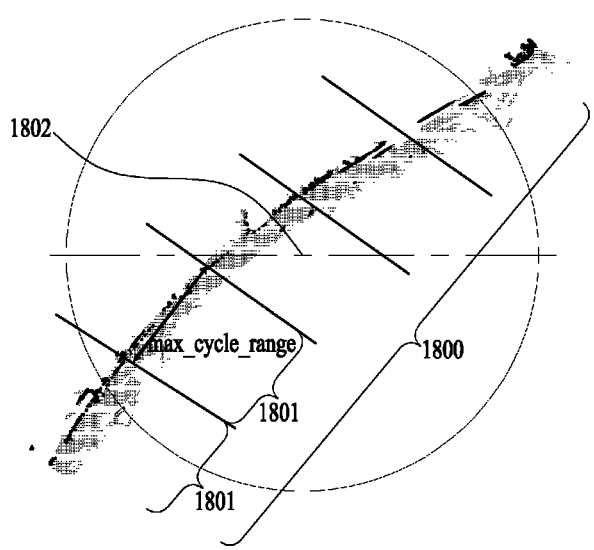
FIG. 18 illustrates an example of slice partitioning based on a laser angle according to embodiments.

FIG. 18 illustrates an example of slice partitioning based on a laser angle according to embodiments.

Based on the laser angle described above, the method/device according to the embodiments may partition points into slices.

The points 1800 are points acquired by LiDAR equipment. The points have regularity according to the laser angle. Based on steps 1 to 4 described above, the points within the laser angle range may be sorted through a rounding process. The points may be classified based on the maximum distance and be set as a slice (1801).

When the LiDAR equipment captures road data for autonomous driving, the center point 1802 shown in FIG. 18 may represent a line on the road. The center point may be a reference point according to embodiments. The coordinates of the reference point may be set values or (0, 0, 0).

Slice partitioning when neither time nor the laser angle is even according to embodiments:

When the point cloud content does not include information about time and laser angle, slices may be separated through the following process (steps 1 to 4). This method is based on points sorted by Morton code.

The maximum distance (max_cycle_range) may be set. The maximum distance may be a set value and may be input to the device according to the embodiments.

A reference point corresponding to (centerx, centery, centerz) may be set. The coordinates of the reference point may be set values and may be input to the device according to the embodiments. However, when there is no input, (0, 0, 0) may be adopted.

1. Points may be sorted by Morton code.
2. The radius r of each point from the reference point may be obtained. Points whose radius fall within the maximum distance (max_cycle_range) may be classified and registered as a slice.
3. When the Morton code of the parent node is changed (through, for example, shifting) or belongs to another parent node, and/or the radius of the point is greater than the maximum distance (max_cycle_range), the left/bottom/front position of the node may re-set as the reference point.
4. Steps 3 and 4 may be repeated until all points are registered in all slices.

Slice partitioning when a frame ID is given according to embodiments:

A method/device according to embodiments may capture point cloud content and configure the point cloud data as frames. The point cloud data may have frame ID. A frame ID represents frames captured at the same time.

The number of spinning cycles divided into one slice may be set by the value of c. The number of cycles may be a set value and may be input to the device according to the embodiments.

1. Points with the same frame ID may be classified as points in one spinning cycle.
2. Points belonging to cycle c may be classified and registered as one slice.

Slice partitioning when position information about LiDAR equipment is given according to embodiments:

When the point cloud content does not additionally have captured frame id, slices may be separated through the following process (steps 1 and 2).

The number of spinning cycles divided into one slice may be set by the value of c. The number of cycles may be a set value and may be input to the device according to the embodiments.

1. Points having the same position information about LiDAR equipment may be classified as points in one spinning cycle.
2. Points belonging to cycle c may be classified and registered as one slice.

This is because when the LiDAR equipment captures point cloud data while moving, compression performance may be improved by classifying and compressing points whose positions are the same or similar.

Slices may be generated according to the slice configuration methods according to the above-described embodiments, and the method/device according to the embodiments may perform slice-based geometry coding.

That is, a 3D map point cloud partitioned into slices may be encoded/decoded. Geometry coding may be performed by applying the angular mode to the 3D map point cloud. In changing the points to the angular mode, positions (x, y, z) in the Cartesian coordinate system may be transformed into coordinates (r, i) according to embodiments. That is, the position of a point according to the Cartesian coordinate system may be expressed as a radius, an azimuth angle, and an elevation angle (or laser ID).

The coordinate transformation operation may need to be performed based on the center position of the LiDAR sensor to change values to exact angles. Only when the exact angles are obtained, the data characteristics of content captured with LiDAR may be reflected. Therefore, the accurate position of the center of the LiDAR sensor may affect the compression efficiency of the geometry.

For example, in the case of LiDAR-based spinning data, accurate point cloud data and/or prediction data about roads and buildings adjacent to the roads may be obtained by setting the initial starting point as the origin. In addition, point cloud data may be predicted with spinning-related regularity maintained. Thus, slicing points based on the same center of LiDAR increases the coding performance That is, the method of setting the center of each slice is important.

The position of each LiDAR sensor is required to be signaled for each slice to accurately reconstruct the position information in the decoding process.

Since the 3D map point cloud is provided as multiple slices into which multiple combined frames are partitioned, the position information about the sensor may be estimated through calculation according to the partitioning method. Hereinafter, a method of estimating the sensor position will be described.

A method of deriving position information about a sensor when point cloud content is partitioned into slices based on a laser angle according to embodiments:

When point cloud content has a time and a laser angle or has a laser angle and is thus partitioned into slices based on the laser angle, the position information about the LiDAR sensor may be derived through the process (steps 1 and 2) disclosed below.

Figure 19:
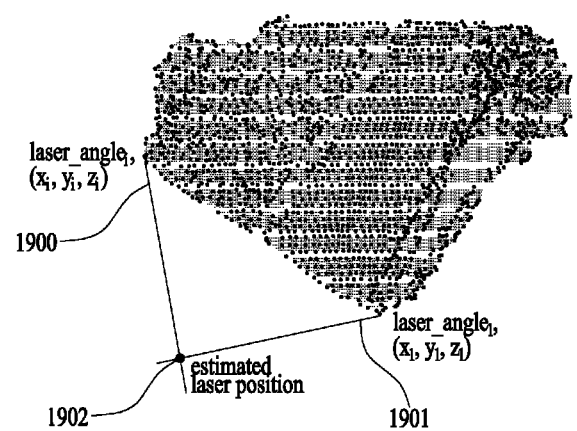
FIG. 19 illustrates an example of a method of estimating a position of a LiDAR sensor according to embodiments.

FIG. 19 illustrates an example of a method of estimating a position of a LiDAR sensor according to embodiments.

The number of spinning cycles divided into one slice may be set by the value of c. The number of cycles may be a set value and may be input to the device according to the embodiments.

In the example of a spinning cycle according to embodiments, one spinning cycle may constitute one slice, or a group of two or more spinning cycles may constitute one slice.
 1. Two straight lines may be created based on the angles and positions of a point 1901, which has the smallest laser angle, and a point 1900, which has the largest laser angle. A position where the two straight lines meet may be estimated as a position 1902 of the LiDAR sensor.
 2. When the points are classified as points belonging to cycle c, the value of the LiDAR sensor position may be estimated for each position in cycle c, and the average of c sensor position values may be set as the sensor position value for the corresponding slice.

The position may be estimated by other values than the average, such as the median, according to data characteristics.

A method of deriving position information about a sensor when point cloud content is partitioned into slices based on the position information about the LiDAR equipment according to embodiments:

When each point has position information for the point cloud content captured by the LiDAR equipment and is partitioned into slices based on the value thereof, sensor position information may be derived through the position information about the corresponding LiDAR sensor.

The number of spinning cycles divided into one slice may be set by the value of c. The value of c may be a set value and may be input to the device according to the embodiments.
 1. The LiDAR sensor position value included in the content may be set as the sensor position (laser position for the slice). In this process, the coordinate transformation may be performed according to the coordinate system in which the position value of the sensor is used.
 2. When the points are classified as points belonging to cycle c, the value of the LiDAR sensor position may be estimated for each position in cycle c, and the average of c sensor position values may be set as the sensor position value for the corresponding slice.

The position may be estimated by other values than the average, such as the median, according to data characteristics.

A method of deriving position information about other sensors according to embodiments:

When the point cloud content is partitioned into slices without additional data of laser angle or is not partitioned into slices based on the position information about the LiDAR equipment, the position information about the LiDAR sensor may be derived through the following process (steps 1 to 6).

The decimal point position n of the value of the radius to be rounded off in terms of accuracy may be set. The decimal point position may be a set value and may be input to the device according to the embodiments.

FIG. 20 illustrates an example of estimating a position of a slice sensor according to embodiments.
 1. The position for LiDAR sensor estimation in a slice may be simplified into the following 5 types (see FIG. 20)
     1) The centroid 2000 of the slice;
     2) x=left, y, z is the centroid 2001 of the slice;
     3) x=right, y, z is the centroid 2002 of the slice;
     4) y=top, x, z is the centroid 2003 of the slice;
     5) y=bottom, x, z is the centroid 2004 of the slice.

The above example of types may be changed according to the axis. The above axes may correspond to a case where the yz plane is a road. In the G-PCC compression method, the order of axes may be changed, and the yz plane may be set as a road.

The x, y, and z axes of FIG. 20 may be set differently according to embodiments, and the sensor estimation position in the slice may be the centroid of the slice, or the left, right, top, bottom, or the like of the slice.
 2. The points may be temporarily changed to angles (r, $\phi$, i) based on each centroid. Based on the sensor position estimated according to method 1, the coordinates of the points in the slice may be transformed into angles.
 3. The radius obtained by rounding radius ri at the n-th position below the decimal point may be defined as r'i.
 4. Points may be sorted based on radius r'i.

5. When there is a centroid belonging to the same r'i while having a different azimuth angle φ in the sorted state, the centroid may be estimated as the position of the LiDAR sensor.
6. When there is no centroid found in step 5 by all centroid related methods, the angular mode according to the embodiments may not be applied to the slice.

This is because data having various azimuth angles at the centroid is a type suitable for the angular mode, as shown in FIG. 15. The method/device according to the embodiments may not use the angular mode when the data does not have regularity suitable for the angular mode.

Figure 23:
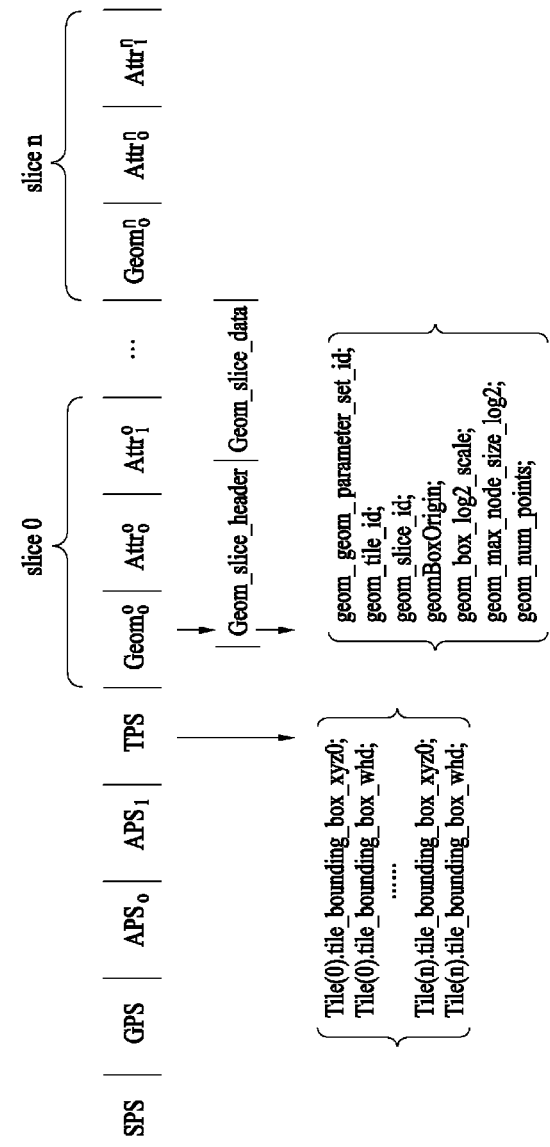
FIG. 23 illustrates a bitstream containing point cloud data according to embodiments.

The method/device according to the embodiments may provide the receiving side with information indicating whether the angular mode is applied for each slice (see FIGS. 23 and 24).

The method/device according to the embodiments may perform attribute coding on point cloud data (attribute coding).

According to embodiments, a 3D map point cloud partitioned into slices may be encoded/decoded. In one slice, geometry and attributes may be present in pairs for each point. For example, point Pi may be composed of (position information (xi, yi, zi), color information (ri, gi, bi), reflectance (reflectancei), etc.).

Geometry coding and attribute coding may be sequentially performed for each slice. When the angular mode is used in geometry coding, attribute coding may generate LOD based on the position in the angular mode and configure nearest neighbours or may be applied to RAHT.

FIG. 21 illustrates a point cloud data transmission device according to embodiments.

The point cloud data transmission device according to the embodiments of FIG. 21 corresponds to the transmission device 10000, the point cloud video encoder 10002, and the transmitter 10003 of FIG. 1, the acquisition 20000-encoding 20001-transmission 20002 of FIG. 2, the encoder of FIG. 4, the transmitter of FIG. 12, the device of FIG. 14, and the like, and carries out the transmission method according to the embodiments. Each component of the transmission device may correspond to hardware, software, a processor, and/or a combination thereof.

The data input unit may receive geometry data and attribute data of the point cloud data, and/or setting values related to parameters.

The data input unit may parse additional information related to the point cloud data. The additional information may include time, a laser angle, and a sensor position, and characteristics of the additional information may be indicated as flags.

The coordinate transformer may transform the coordinates representing a position of point cloud data into coordinates suitable for coding.

A primary geometry information transform/quantization processor may quantize the geometry data (geometry information). For example, quantization may be performed based on a quantization parameter.

The spatial partitioner may partition the space of the point cloud data.

Partitioning may be performed on a basis of an appropriate spatial unit to increase efficiency of geometry/attribute encoding.

A tile partitioner may partition the point cloud data into tiles, wherein a tile is one of spatial units.

A slice partitioner may partition the tile into slices. Coding may be applied on a slice-by-slice basis. The slice partitioner may receive a flag indicating whether the content is captured by the LiDAR equipment. The slice partitioner may perform operations by a LiDAR content partitioner or other uniform/octree/sequential partitioners depending on whether the content is captured by the LiDAR equipment.

The LiDAR content partitioner may control/apply content partitioning methods through the additional information parsed through the data input unit. The content partitioning methods include: 1) slice partitioning when time and laser angle are given, 2) slice partitioning when only time is given, 3) slice partitioning when only laser angle is given, 4) slice partitioning when neither time nor laser angle is given, 5) slice partitioning when Frame id is given, and 6) slice partitioning when position information about the LiDAR equipment is given. The methods may be applied to partition the content on a slice basis.

That is, instead of encoding a predetermined slice for the content, a new slice may be adaptively generated in consideration of data characteristics.

The geometry information encoder may encode geometry data based on slices.

A secondary geometry information transform/quantization processor may additionally quantize the geometry data. Quantization may be applied based on a quantization parameter.

The voxelizer may voxelize the point cloud data.

Depending on the geometry coding type, predictive tree-based coding, octree-based coding, and trisoup-based coding may be performed.

When data is partitioned through the LiDAR content partitioner, the predictive tree generator may set the value of a LiDAR sensor position. Methods of deriving the position of the LiDAR sensor may include 1) a method of deriving position information about the LiDAR sensor when the data is partitioned into slices based on the laser angle, 2) a method of deriving position information about the LiDAR sensor when the data is partitioned into slices based the position information about the LiDAR equipment, and 3) a method of deriving position information about the LiDAR sensor in other cases. The estimated position information about the LiDAR sensor may be transmitted as signaling information (metadata, parameters) to the decoder (Signaling of LiDAR sensor position information per slice).

When the data is partitioned through the LiDAR content partitioner, the predictive tree generator may check whether the angular mode is applied by checking the value of the LiDAR sensor position. When the angular mode is applicable, the angular mode of geometry coding may be set and the angular mode may be applied. Whether the angular mode is applied may be transmitted as signaling information (metadata, parameters) to the decoder (Signaling of angular mode per slice).

The predictive tree generator may generate a predictive tree to which the angular mode is applied.

When data is partitioned through the LiDAR content partitioner, the octree generator may set the value of a LiDAR sensor position. Methods of deriving the position of the LiDAR sensor may include 1) a method of deriving position information about the LiDAR sensor when the data is partitioned into slices based on the laser angle, 2) a method of deriving position information about the LiDAR sensor when the data is partitioned into slices based the position information about the LiDAR equipment, and 3) a method of deriving position information about the LiDAR sensor in other cases. The estimated position information about the LiDAR sensor may be transmitted as signaling information (metadata, parameters) to the decoder (Signaling of LiDAR sensor position information per slice).

When the data is partitioned through the LiDAR content partitioner, the octree generator may check whether the angular mode is applied by checking the value of the LiDAR sensor position. When the angular mode is applicable, the angular mode of geometry coding may be set and the angular mode may be applied. Whether the angular mode is applied may be transmitted as signaling information (metadata, parameters) to the decoder (Signaling of angular mode per slice).

The octree generator may generate an octree to which the angular mode is applied.

The geometry information predictor may predict geometry information based on the predictive tree and generate residual geometry information based on the predicted geometry information.

The RDO prediction determiner may predict geometry data based on ratio distortion optimization (RDO) and generate residual geometry information.

The trisoup generator may encode the geometry based on the trisoup.

The geometry position reconstructor may reconstruct the encoded geometry. Attribute data of the point cloud data may be encoded based on the reconstructed geometry information.

The geometry information entropy encoder may encode the residual geometry information based on an entropy coding method.

The geometry information encoder may generate a geometry bitstream containing the geometry data.

The attribute information encoder encodes the attribute data based on the reconstructed geometry information. Further, it encodes residual attribute information to generate an attribute bitstream containing the attribute data.

Contents omitted in FIG. 21 conform to the description of the encoding operation of the transmission device 10000, the point cloud video encoder 10002, and the transmitter 10003 of FIG. 1, the acquisition 20000-encoding 20001-transmission 20002 of FIG. 2, the encoder of FIG. 4, the transmitter of FIG. 12, the device of FIG. 14, and the like.

Figure 22:
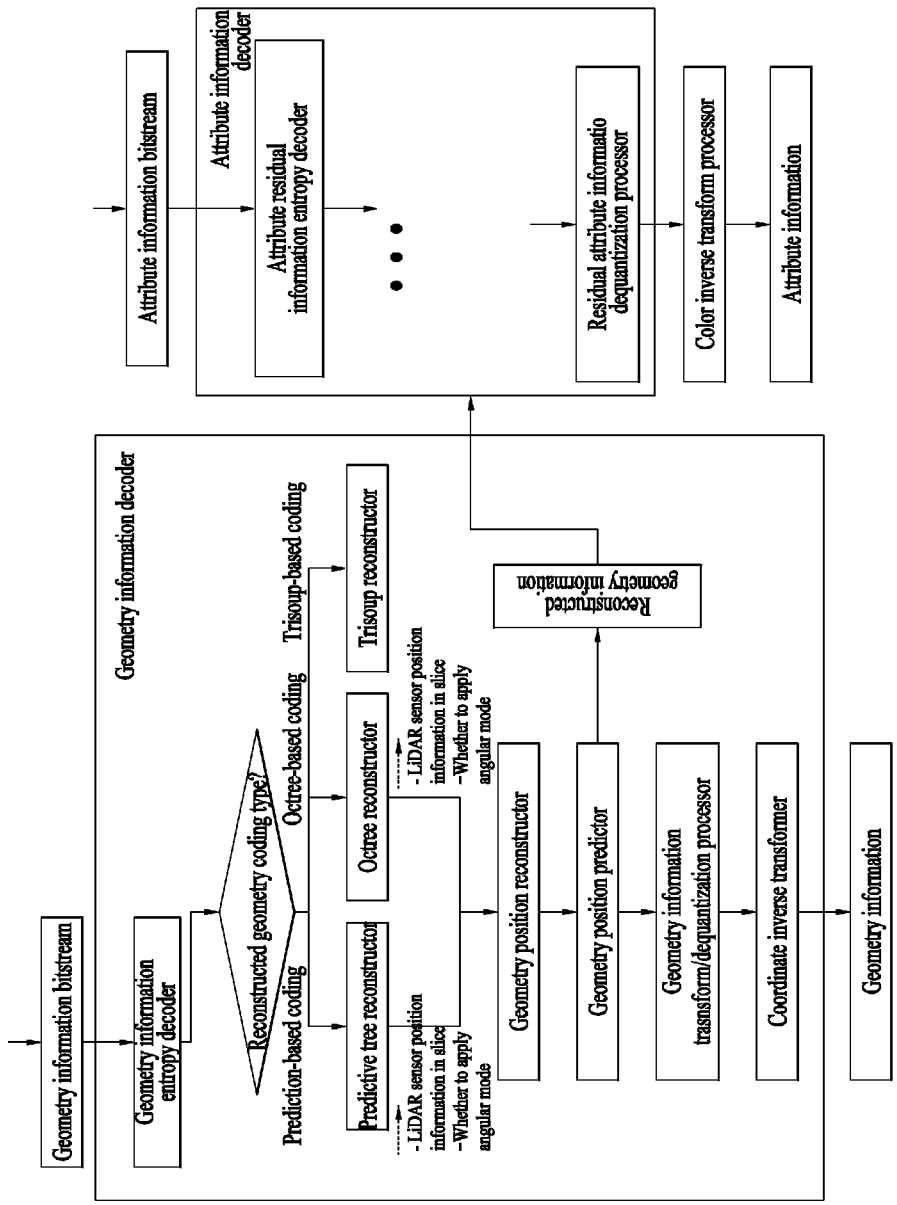
FIG. 22 illustrates a point cloud data reception device according to embodiments.

FIG. 22 illustrates a point cloud data reception device according to embodiments.

The point cloud data reception device according to the embodiments of FIG. 22 corresponds to the reception device 10004, the receiver 10005, the point cloud video decoder 10006 in FIG. 1, the transmission 20002-decoding 20003-rendering 20004 in FIG. 2, the decoder in FIGS. 10 and 11, the reception device in FIG. 13, the device in FIG. 14, and the like, and carries out the reception method according to the embodiments. Each component of the reception device corresponds to hardware, software, a processor and/or a combination thereof. The reception method and the transmission method may correspond to each other or may be reverse processes to each other.

The geometry information decoder may decode geometry data.

The geometry entropy decoder may encode the geometry data based on an entropy scheme.

The geometry information decoder may reconstruct the geometry data of the point cloud data according to a decoding scheme matching each coding type, such as prediction-based coding, octree-based coding, and/or trisoup-based coding according to the geometry coding type.

When the coding type is prediction-based coding, the predictive tree reconstructor may reconstruct (restore) the geometry data based on the predictive tree.

The predictive tree reconstructor may receive and restore the information about whether the angular mode according to the embodiments is applied to reconstruct a predictive tree and decode the predicted geometry value (Reconstruction/application of angular mode per slice). That is, as shown in FIGS. 23 and 24, the reception device may parse the metadata contained in the bitstream and recognize whether the angular mode is applied from the parameter information included in the metadata.

When the angular mode is applied, the predictive tree reconstructor may receive and reconstruct the position information about the LiDAR sensor so as to be used in decoding the corresponding transmitted geometry bitstream value (Reconstruction/application of LiDAR sensor position information per slice). That is, as shown in FIGS. 22 and 23, the reception device may parse the metadata contained in the bitstream and recognize the position information about the LiDAR sensor from the parameter information included in the metadata.

FIG. 22 illustrates a reception method/device (point cloud data reception method/device) and a configuration (decoding process) of a point cloud data decoder according to embodiments. The reconstruction process of the predictive tree reconstructor according to the embodiments may correspond to a reverse process to the operation of the predictive tree generator.

When the geometry coding type is octree-based coding, the octree reconstructor may reconstruct (restore) geometry data based on the octree.

The octree reconstructor may receive and restore the information about whether the angular mode is applied to reconstruct a corresponding predictive tree (octree) and decode the predicted geometry value (Reconstruction/application of angular mode per slice). That is, as shown in FIGS. 23 and 24, the reception device may parse the metadata contained in the bitstream and recognize whether the angular mode is applied from the parameter information included in the metadata.

When the angular mode is applied, the octree reconstructor may receive and reconstruct the position information about the LiDAR sensor to decode the corresponding transmitted geometry bitstream value (Reconstruction/application of LiDAR sensor position information per slice). That is, as shown in FIGS. 22 and 23, the reception device may parse the metadata contained in the bitstream and recognize the position information about the LiDAR sensor from the parameter information included in the metadata.

The reconstruction process of the octree reconstructor according to the embodiments may correspond to a reverse process to the operation of the octree generator.

When the geometry coding type is trisoup-based coding, the trisoup reconstructor may reconstruct (restore) the geometry data based on a trisoup.

The geometry position reconstructor may reconstruct the position value of the geometry based on a predictive tree, an octree, and/or a trisoup. The reconstructed position is transmitted to the attribute information decoder to encode attribute data related to the position.

The geometry information predictor may generate a predicted value for geometry (geometry information). The original geometry may be reconstructed by summing the residual geometry information related to the predicted value.

The geometry information transform/dequantization processor may dequantize the geometry information. In response to the application of the quantization process to the quantization parameter at the transmitting side, the geometry information may be reconstructed by performing dequantization.

When the coordinate system of the geometry information (geometry) is transformed at the transmitting side, the coordinate inverse transformer may reconstruct the geometry by inversely transforming the coordinates.

The geometry information decoder may reconstruct the geometry information (geometry data).

The attribute information decoder may receive an attribute information bitstream and reconstruct attribute information (attribute data).

Contents omitted in FIG. 22 conform to the description of the decoding operation of the reception device 10004, receiver 10005, point cloud video decoder 10006 in FIG. 1, the transmission 20002-decoding 20003-rendering 20004 in FIG. 2, the decoder in FIGS. 10 and 11, the reception device in FIG. 13, the device in FIG. 14, and the like.

FIG. 23 illustrates a bitstream containing point cloud data according to embodiments.

The transmission device 10000, point cloud video encoder 10002, transmitter 10003 in FIG. 1, acquisition 20000-encoding 20001-transmission 20002 in FIG. 2, the encoder in FIG. 4, the transmission device in FIG. 12, the device in FIG. 14, the transmission device in FIG. 21, and the like may encode geometry data and attribute data, generate metadata related to the encoding process, and generate a bitstream containing point cloud data and parameter information as shown in FIG. 23.

The reception device 10004, receiver 10005, and point cloud video decoder 10006 in FIG. 1, the transmission 20002-decoding 20003-rendering 20004 in FIG. 2, the decoders in FIGS. 10 and 11, the reception device in FIG. 13, the device of FIG. 14, and the reception device in FIG. 22 may receive the bitstream as shown in FIG. 23, decode metadata, and decode, reconstruct, and render the point cloud data based on the metadata.

Each abbreviation has the following meaning. Each abbreviation may be referred to by another term within the scope of the equivalent meaning. SPS: Sequence Parameter Set; GPS: Geometry Parameter Set; APS: Attribute Parameter Set; TPS: Tile Parameter Set; Geom (geometry): geometry bitstream=geometry slice header+geometry slice data; Attr (attribute): Attribute bitstream=attribute blick header+attribute brick data.

According to embodiments, a slice may be a unit of encoding/decoding, and a brick may correspond to a slice or may be a sub-unit. In the case of slice-by-slice processing, geometry/attributes may be positioned in the bitstream on a slice-by-slice basis. In the case of brick-by-brick processing, the geometry/attributes may be positioned on a brick-by-brick basis.

A transmission method/device according to embodiments may generate angular mode-related option information for each slice according to embodiments, add the same to a slice-level geometry header in the bitstream structure, and transmit the information. A reception method/device according to embodiments may decode the point cloud data based on this information.

For example, tiles or slices are provided such that point cloud data may be divided into regions and processed.

When the point cloud data is partitioned into regions, an option for generating different sets of neighbor points for the respective regions may be configured to provide a selection method exhibiting low complexity and low reliability of results or a selection method exhibiting high complexity and high reliability. The option may be configured differently according to the capacity of the receiver.

When a point cloud is partitioned into slices, different options may be applied to each slice.

FIG. 24 shows syntax of a geometry data unit header according to embodiments.

FIG. 24 shows syntax of information that may be additionally included in a geometry data unit header. FIG. 24 shows a geometry data unit header contained in the bitstream of FIG. 22.

In the process of encoding/decoding geometry data, option information related to the angular mode may be added to the geometry data unit header and signaled. It may be combined with other parameter information and efficiently signaled to support the angular mode function for each slice. The name of the signaling information may be understood within the scope of the meaning and function of signaling information.

gsh_geom_angular_origin_xyz[k]: Indicates the LiDAR sensor position for the corresponding slice.

gsh_geometry_parameter_set_id: Specifies the value of gps_geom_parameter_set_id of the active GPS.

gsh_tile_id: Specifies the value of the tile id that is referred to by the GSH. The value of gsh_tile_id may be in the range of 0 to XX, inclusive.

gsh_slice_id: Identifies the slice header for reference by other syntax elements. The value of gsh_slice_id may be in the range of 0 to XX, inclusive.

The PCC encoding method, the PCC decoding method, and the signaling method of the above-described embodiments may provide the following effects.

When frames are captured and stored one by one through LiDAR equipment, the angular mode may be applied. When multiple frames are captured with LiDAR equipment and integrated into one piece of content to generate 3D map data, the center position of the LiDAR equipment may differ among data.

When the position is changed to the angular characteristic, that is, the angle (r, i) representing the data captured by the LiDAR equipment, regularity of points may be hidden. Accordingly, applying the angular mode may not be as efficient as Cartesian coordinate-based compression. In this regard, embodiments provide methods for retaining features captured by the LiDAR equipment in 3D map data in order to increase compression efficiency using the features captured by the LiDAR equipment.

Embodiments include a method of partitioning content into slices to apply an angular mode for supporting efficient geometry compression of 3D map data captured by LiDAR equipment and integrated into one piece of content.

Accordingly, the embodiments may provide a method of partitioning content into slices for efficient geometry compression of Geometry-based Point Cloud Compression (G-PCC) when point cloud frames captured by LiDAR equipment are integrated into one piece of point cloud content. Thereby, geometry compression coding/decoding efficiency may be increased.

The point cloud data transmission/reception method/device according to the embodiments may more efficiently compress point cloud data based on an operation of partitioning point cloud data captured by LiDAR equipment based on a 3D map and related signaling information.

Therefore, the transmission method/device according to the embodiments may efficiently compress the point cloud data and transmit the compressed data, and also deliver signaling information for the data. Accordingly, the reception method/device according to the embodiments may also efficiently decode/reconstruct the point cloud data.

Figure 25:
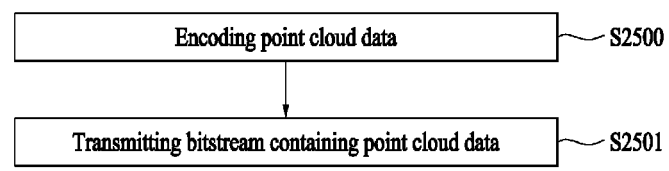
FIG. 25 illustrates a method of transmitting point cloud data according to embodiments.

FIG. 25 illustrates a method of transmitting point cloud data according to embodiments.

A method/device for transmitting point cloud data according to embodiments (which corresponds to the transmission device 10000, point cloud video encoder 10002, transmitter 10003 in FIG. 1, the acquisition 20000-encoding 20001-transmission 20002 in FIG. 2, the encoder in FIG. 4, the transmission device in FIG. 12, the device in FIG. 14, the transmission device in FIG. 21, etc.) may encode and transmit point cloud data using the method illustrated in FIG. 25.

S2500: The point cloud data transmission method according to the embodiments may include encoding point cloud data.

The encoding operation according to the embodiments may include the operations of the transmission device 10000 and point cloud video encoder 10002 in FIG. 1, the encoding 20001 in FIG. 2, the encoder in FIG. 4, the encoder in FIG. 12, the encoding of the XR device 1430 in FIG. 14, the encoding in FIGS. 15 to 20, the geometry and attribute encoding in FIG. 21, and the bitstream generation and metadata generation in FIGS. 23 and 24.

S2501: The point cloud data transmission method according to the embodiments may further include transmitting a bitstream containing the point cloud data.

The transmission operations according to the embodiments may include the operations of the transmission device 10000 and transmitter 10003 in FIG. 1, the transmission 20002 in FIG. 2, the transmission of encoded bitstream in FIG. 4, the transmission in FIG. 12, the transmission of the XR device 1430 in FIG. 14, the transmission after encoding in FIGS. 15 to 20, the transmission after encoding geometry and attributes in FIG. 21, and the bitstream transmission and metadata transmission in FIGS. 23 and 24.

Figure 26:
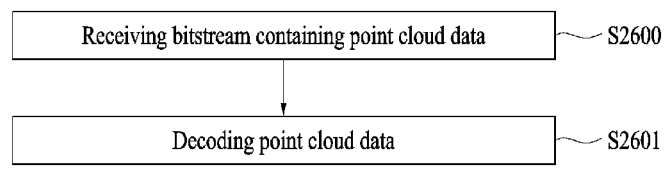
FIG. 26 illustrates a method of receiving point cloud data according to embodiments.

FIG. 26 illustrates a method of receiving point cloud data according to embodiments.

The point cloud data reception method/device according to the embodiments (which corresponds to the reception device 10004, receiver 10005, and point cloud video decoder 10006 in FIG. 1, the transmission 20002-decoding 20003-rendering 20004 in FIG. 2, the decoders in FIGS. 10 and 11, the reception device in FIG. 13, the device in FIG. 14, the reception device/method in FIG. 22, etc.) may decode the point cloud data using the method illustrated in FIG. 26.

S2600: The point cloud data reception method according to the embodiments may include receiving a bitstream containing point cloud data.

The reception operations according to the embodiments may include the operations of the reception device 10004 and receiver 10005 in FIG. 1, the reception according to transmission in FIG. 2, the bitstream reception in FIG. 11, the reception in FIG. 13, the reception by the XR device 1730 in FIG. 14, the data reception according to encoding in FIGS. 15 to 20, the transfer for geometry and attribute decoding in FIG. 22, and the bitstream reception and metadata reception in FIGS. 23 and 24.

S2601: The point cloud data reception method according to the embodiments may further include decoding the point cloud data.

The decoding operation according to the embodiments may include the operations of the reception device 10004 and point cloud video decoder 10006 in FIG. 1, the decoding 20003 in FIG. 2, the decoder in FIGS. 10 and 11, the decoder in FIG. 13, the decoding by the XR device 1730 in FIG. 14, the decoding in FIGS. 15 to 20, the geometry and attribute decoding in FIG. 22, and the bitstream decoding and metadata decoding in FIGS. 23 and 24.

Referring to FIG. 1, a point cloud data transmission method according to embodiments may include encoding point cloud data, and transmitting the point cloud data.

Referring to FIGS. 15, 16 and 17, efficient compression/decompression may be implemented based on the fact that LiDAR data according to embodiments have spinning regularity.

For example, point cloud data is acquired based on an angle of spinning.

Referring to FIGS. 16 and 17, such data may be referred to as 3D map data, and particularly has a regularity in terms of time and laser angle. According to embodiments, the laser angle may be referred to simply as an angle.

For example, the point cloud data may be distinguished according to at least one of the time or the angle.

Referring to FIGS. 15 to 18, embodiments propose a slice partitioning method based on angular characteristics. The angular characteristics may include a time and an angle (laser angle).

For example, the method according to the embodiments may further include partitioning the point cloud data into slices. The partitioning may include sorting points of the point cloud data based on time and sorting the points based on an angle.

Referring to FIGS. 15 to 18, as a time-based slice partitioning method, the method according to the embodiments may further include partitioning the point cloud data into slices, wherein the partitioning may include sorting points of the point cloud data based on the time, and generating a slice containing the points sorted based on the time.

Furthermore, as an angle-based slice partitioning method, the method according to the embodiments may further include partitioning the point cloud data into slices, wherein the partitioning may include generating a slice containing points of the point cloud data based on the angle.

That is, this method of constructing slices may enable efficient data compression/reconstruction based on regularity of spinning even when the data measured by LiDAR equipment is integrated.

Referring to FIG. 19, the position information about a sensor may be derived based on a laser angle.

The encoding according to the embodiments may include encoding geometry data of the point cloud data, and estimating a center position for the spinning based on a minimum value of the angle and a maximum value of the angle for the slice.

Referring to FIGS. 19 and 20, the position information about a sensor may be derived based on the position of LiDAR equipment.

The encoding according to the embodiments may include encoding geometry data of the point cloud data, based on presence of position information about a device related to acquisition of the point cloud data for the slice, estimating a center position for the spinning based on the position information about the device, and based on the spinning being performed at least twice, generating an average of the center position for the spinning according to the number of times of the spinning.

Referring to FIG. 20, slices that are not based on the angle may be used.

For example, the method according to the embodiments may further include partitioning the point cloud data into a slice, and the encoding may include encoding geometry data of the point cloud data, estimating a center position for the spinning based on a centroid of the slice.

Referring to FIG. 21, a device according to embodiments may include an encoder an encoder configured to encode point cloud data, and a transmitter configured to transmit a bitstream containing the point cloud data. The transmission device may perform each operation of the transmission method.

A method of receiving point cloud data according to embodiments may include receiving a bitstream containing point cloud data, and decoding the point cloud data. The reception method may perform the reverse process of the transmission method.

The point cloud data may be acquired based on an angle of spinning, and may be distinguished according to at least one of time and an angle. Accordingly, the point cloud data may have a time-based characteristic and an angle-based characteristic.

The decoding may include decoding geometry data of the point cloud data. The decoding of the geometry data may include decoding a slice containing the geometry data based on position information related to the spinning.

Referring to FIG. 23, the bitstream may contain angular mode information related to a slice containing the point cloud data.

A reception device according to embodiments may include a receiver configured to receive a bitstream containing point cloud data, and a decoder configured to decode the point cloud data. The reception device may perform the operations of the reception method.

Accordingly, the embodiments may efficiently perform geometry compression of 3D map data captured through LiDAR equipment and integrated into one piece of content. A mode using an angular characteristic (spinning characteristic) may be referred to as an angular mode. The data may be partitioned into slices based on the angular mode so as to be compressed and reconstructed.

Accordingly, the embodiments may provide a method of partitioning content into slices for efficient geometry compression of Geometry-based Point Cloud Compression (G-PCC) when point cloud frames captured by LiDAR equipment are integrated into one piece of point cloud content. Thereby, geometry compression coding/decoding efficiency may be increased.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/ reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method of encoding point cloud data, the method comprising:
encoding geometry data of point cloud data based on an octree;
encoding attribute data of the point cloud data; and
generating syntax information including information for representing whether or not the geometry data is encoded based on an angular mode for angular coordinates, and information for representing an identifier of a slice for the geometry data,
wherein the geometry data is encoded based on a maximum value related to the angular coordinates,
wherein the geometry data, the attribute data and the syntax information are included in a bitstream.

2. The method of claim 1, wherein the point cloud data is acquired based on a spinning angle for a LiDAR sensor.

3. The method of claim 2, wherein the point cloud data is distinguished according to at least one of time or an angle for the LiDAR sensor.

4. The method of claim 3, further comprising:
partitioning the point cloud data into slices,
wherein the partitioning comprises:
sorting points of the point cloud data based on the time;
generating a slice containing the sorted points based on the angle.

5. The method of claim 3, further comprising:
partitioning the point cloud data into slices,
wherein the partitioning comprises:
generating a slice containing points of the point cloud data based on the angle.

6. The method of claim 4, wherein the encoding comprises:
encoding the geometry data of the point cloud data;
estimating a center position for the LiDAR sensor based on a minimum value of the angle and a maximum value of the angle for the slice.

7. The method of claim 4, wherein the encoding comprises:
encoding the geometry data of the point cloud data;
based on presence of position information about a device related to acquisition of the point cloud data for the slice, estimating a center position for the LiDAR sensor based on the position information about the device;
based on spinning operation of the LiDAR sensor being performed at least twice, generating an average of the center position for the spinning according to a number of spinning times for the LiDAR sensor.

8. The method of claim 3, further comprising:
partitioning the point cloud data into a slice,
wherein the encoding comprises:
encoding the geometry data of the point cloud data;
estimating a center position for the LiDAR sensor based on a centroid of the slice.

9. A device for encoding point cloud data, the device comprising:
a memory; and
at least one processor connected to the memory, the at least one processor configured to:
encode geometry data of point cloud data based on an octree:
encode attribute data of the point cloud data; and
generate syntax information including information for representing whether or not the geometry data is encoded based on an angular mode for angular coordinates, and information for representing an identifier of a slice for the geometry data,
wherein the geometry data is encoded based on a maximum value related to the angular coordinates,
wherein the geometry data, the attribute data and the syntax information are included in a bitstream.

10. The device of claim 9, wherein the point cloud data is acquired based on a spinning angle for a LiDAR sensor, the at least one processor further configured to:
partition the point cloud data into slices,
sort points of the point cloud data based on time;
generate a slice containing the sorted points based on an angle for the LiDAR sensor.

11. A method of decoding point cloud data, the method comprising:
obtaining syntax information in a bitstream, wherein the syntax information includes information for representing whether or not geometry data of point cloud data in the bitstream is encoded based on an angular mode for angular coordinates, and information for representing an identifier of a slice for the geometry data;
decoding the geometry data based on an octree; and
decoding attribute data of the point cloud data,
wherein the geometry data is decoded based on a maximum value related to the angular coordinates.

12. The method of claim 11, wherein the point cloud data is acquired based on a spinning angle for a LiDAR sensor.

13. The method of claim 12, wherein the point cloud data is distinguished according to at least one of time or an angle for the LiDAR sensor.

14. The method of claim 13,
wherein the decoding of the geometry data comprises:
decoding a slice containing the geometry data based on position information related to the LiDAR sensor.

15. A device for decoding point cloud data, the device comprising:
a memory; and
at least one processor connected to the memory, the at least one processor configured to:
obtain syntax information in a bitstream, wherein the syntax information includes information for representing whether or not geometry data of point cloud data in the bitstream is encoded based on an angular mode for angular coordinates, and information for representing an identifier of a slice for the geometry data;
decode the geometry data based on an octree; and
decode attribute data of the point cloud data,
wherein the geometry data is decoded based on a maximum value related to the angular coordinates.

16. The device of claim 15, wherein the point cloud data is acquired based on a spinning angle for a LiDAR sensor.

17. The device of claim 16, wherein the point cloud data is distinguished according to at least one of time or an angle for the LiDAR sensor.

18. The device of claim 17,
wherein the at least one processor is further configured to decode a slice containing the geometry data based on position information related to the LiDAR sensor.

* * * * *